(12) United States Patent
Penner et al.

(10) Patent No.: US 8,108,777 B2
(45) Date of Patent: Jan. 31, 2012

(54) SECTIONS OF A PRESENTATION HAVING USER-DEFINABLE PROPERTIES

(75) Inventors: Nathan Penner, Mountain View, CA (US); Shawn Villaron, San Jose, CA (US); Dachuan Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 12/189,583

(22) Filed: Aug. 11, 2008

(65) Prior Publication Data

US 2010/0037140 A1 Feb. 11, 2010

(51) Int. Cl.
*G06F 3/00* (2006.01)
(52) U.S. Cl. .................. 715/730; 715/731; 715/732
(58) Field of Classification Search ........... 715/730–732
See application file for complete search history.

(56) References Cited

U.S. PATENT DOCUMENTS

| | | | |
|---|---|---|---|
| 5,572,644 A | 11/1996 | Liaw | |
| 6,008,807 A | 12/1999 | Bretschneider | |
| 6,041,333 A | 3/2000 | Bretschneider | |
| 6,128,629 A | 10/2000 | Bretschneider | |
| 6,369,835 B1 * | 4/2002 | Lin | 715/726 |
| 6,396,500 B1 * | 5/2002 | Qureshi et al. | 345/473 |
| 6,473,749 B1 | 10/2002 | Smith | |
| 6,738,075 B1 * | 5/2004 | Torres et al. | 715/723 |
| 6,819,338 B2 | 11/2004 | Heasman | |
| 6,834,371 B1 | 12/2004 | Jensen | |
| 6,938,032 B1 * | 8/2005 | Heath et al. | 1/1 |
| 7,073,127 B2 | 7/2006 | Zhao | |
| 7,206,773 B2 | 4/2007 | Erol | |
| 7,246,316 B2 | 7/2007 | Furlong et al. | |
| 7,246,317 B2 | 7/2007 | Karasawa | |
| 7,266,568 B1 | 9/2007 | Erol | |
| 7,266,773 B2 | 9/2007 | Dorwart | |
| 7,299,418 B2 | 11/2007 | Dieberger | |
| 7,363,581 B2 | 4/2008 | Parks | |
| 7,392,475 B1 | 6/2008 | Leban | |
| 7,493,561 B2 | 2/2009 | Sareen | |

(Continued)

FOREIGN PATENT DOCUMENTS

JP 2001-022257 1/2001
(Continued)

OTHER PUBLICATIONS

International Search Report mailed Nov. 30, 2009, in PCT Application No. PCT/US2009/046529.

(Continued)

*Primary Examiner* — Tadeese Hailu
(74) *Attorney, Agent, or Firm* — Merchant & Gould P.C.

(57) ABSTRACT

In general, this disclosure describes techniques that employ user-defined values of properties of sections of an electronic presentation. As described herein, a user may configure a presentation to include a plurality of sections. Each of the sections includes zero or more slides of the electronic slide presentation. In addition to the slides associated with each section, each of the sections is associated with one or more properties having values that can be defined by an author of the presentation. Because the values of the properties of the sections are user-definable, these properties may, in some implementations of these techniques, enable the author of the presentation to use the sections in ways not possible in presentation applications that merely use sections as a means of grouping thumbnail images of slides for navigation among slides in an authoring interface.

17 Claims, 9 Drawing Sheets

U.S. PATENT DOCUMENTS

| | | | |
|---|---|---|---|
| 7,526,726 B1* | 4/2009 | Skwarecki et al. | 715/731 |
| 7,546,533 B2 | 6/2009 | Sareen | |
| 7,590,939 B2 | 9/2009 | Sareen | |
| 7,743,331 B1* | 6/2010 | Fleischer et al. | 715/731 |
| 7,882,565 B2* | 2/2011 | Collins et al. | 726/27 |
| 2001/0040592 A1 | 11/2001 | Foreman | |
| 2002/0001106 A1* | 1/2002 | Lan | 358/474 |
| 2002/0138389 A1 | 9/2002 | Martone | |
| 2002/0164151 A1 | 11/2002 | Jasinschi | |
| 2002/0174085 A1 | 11/2002 | Nelson | |
| 2003/0101043 A1 | 5/2003 | Boegelund | |
| 2003/0122863 A1 | 7/2003 | Dieberger et al. | |
| 2003/0142145 A1 | 7/2003 | Bennett | |
| 2003/0160814 A1* | 8/2003 | Brown | 345/732 |
| 2003/0222890 A1 | 12/2003 | Salesin et al. | |
| 2003/0222900 A1* | 12/2003 | Schramm-Apple et al. | 345/730 |
| 2003/0231202 A1* | 12/2003 | Parker et al. | 345/730 |
| 2004/0001106 A1 | 1/2004 | Deutscher | |
| 2004/0015595 A1 | 1/2004 | Lin | |
| 2004/0027370 A1 | 2/2004 | Jaeger | |
| 2004/0071453 A1* | 4/2004 | Valderas | 386/125 |
| 2004/0113934 A1* | 6/2004 | Kleinman et al. | 345/732 |
| 2004/0125128 A1 | 7/2004 | Chang | |
| 2004/0128691 A1* | 7/2004 | Egawa et al. | 725/88 |
| 2005/0138570 A1 | 6/2005 | Good et al. | |
| 2005/0246642 A1* | 11/2005 | Valderas et al. | 715/730 |
| 2005/0289453 A1 | 12/2005 | Segal | |
| 2006/0067578 A1* | 3/2006 | Fuse | 382/190 |
| 2006/0080610 A1* | 4/2006 | Kaminsky | 715/730 |
| 2006/0259875 A1* | 11/2006 | Collins et al. | 715/853 |
| 2006/0265659 A1* | 11/2006 | Collins et al. | 715/732 |
| 2006/0282759 A1 | 12/2006 | Collins | |
| 2006/0294469 A1* | 12/2006 | Sareen et al. | 715/730 |
| 2007/0056045 A1* | 3/2007 | Collins et al. | 726/27 |
| 2007/0188520 A1 | 8/2007 | Finley | |
| 2007/0294612 A1 | 12/2007 | Drucker et al. | |
| 2008/0070218 A1* | 3/2008 | Ahl et al. | 434/322 |
| 2008/0189616 A1* | 8/2008 | Coulomb et al. | 715/732 |
| 2009/0044117 A1* | 2/2009 | Vaughan et al. | 715/716 |
| 2010/0031152 A1 | 2/2010 | Villaron | |
| 2010/0037140 A1 | 2/2010 | Penner | |

FOREIGN PATENT DOCUMENTS

| | | |
|---|---|---|
| WO | WO 2006-124140 | 11/2006 |
| WO | WO 2009/087999 | 7/2009 |

OTHER PUBLICATIONS

International Search Report mailed Jan. 29, 2010, in PCT Application No. PCT/US2009/051090.

U.S. Appl. No. 12/184,174, entitled "Creation and Navigation of Infinite Canvas Presentation" filed Jul. 31, 2008 of record.

Kan, Min-Yen, SlideSeer: A Digital Library of Aligned Document and Presentation Pairs, Copyright 2006, 10 pages, http://www.comp.nus.edu.sg/~kanmy/papers/jcd12004.pdf.

Keynote '08 User's Guide, Apple Inc. © 2008, 204 pages, http://manuals.info.apple.com/en/Keynote08_UserGuide.pdf.

Welcome to PowerPoint 2007, accessed 2008, 20 pages, http://www.computerbook.nl/pdf/9780470040591.pdf.

Deneba Systems, Inc., *Canvas Tips and Techniques*, © 1995-2002, 9 pages; http://www.acdamerica.com/support-canvas/tutorials/presentation.pdf.

Dontcheva et al., *v4v: a View for the Viewer*, © 2005 AIGA, cover page plus 8 pages; http://research.microsoft.com/~sdrucker/papers/v4v.pdf.

Drucker et al., *Comparing and Managing Multiple Versions of Slide Presentations*, USIST'06, Oct. 15-18, 2006, © 2005 ACM 1-59593-313-1/06/0010; 10 pages, http://research.microsoft.com/~sdrucker/papers/fp21 4-DruckerFinalSmall.pdf.

*Grass Roots Software FREEPATH-EDU Nonlinear Presentation Software*, accessed website Aug. 14, 2008,3 pages; http://www.fullcompass.com/product/233150.html.

Moscovich et al., *Customizable Presentations*, accessed website Aug. 14, 2008, 5 pages; http://www.cs.brown.edu/people/tm/papers/cpresentations.pdf.

Photodex Corporation, *ProShow Producer Feature Overview*, © 2008, 2 pages; http://www.photodex.com/products/producer/features.html.

University of Maryland, *CounterPoint: A Zooming Presentation Tool*, accessed website Aug. 14, 2008, 2 pages; http://www.cs.umd.edu/hcil/counterpoint.

*ZuiPrezi Nonlinear Presentation Editor*, accessed website Aug. 14, 2008, 3 pages; http://test.zuiprezi.kibu.hu/.

"Content Applications," Products-Content Applications accessed at http://web.archive.org/web/20030810211219/www.documentum.com/products/content_a; accessed on Aug. 10, 2003, 2 pages.

"Delivering format transformation and analysis for all content," EMC Documentum Content Transformation Services, Copyright 2006, 4 pages.

"Microsoft Office Picture Manager Basics" Nov. 8, 2006, 4 pages.

"Microsoft Office Picture Manager," Microsoft Office Picture Manager accessed at: http://en.wikipedia.org/wiki/Microsoft_Office_Picture_Manager; accessed on Dec. 13, 2007, 2 pages.

"SpanSoft," Software from SpanSoft at Download-By.Net, copyright 2006, 4 pages.

"What is Slide Librarian," Slide Librarian, Current Version 2.4; accessed at: http://www.spansoft.org/slide_rt.htm; accessed on Dec. 7, 2007, 3 pages.

"CounterPoint: A Zooming Presentation Tool" accessed at: http://web.archive.org/web/20050205082738/www.cs.umd.edu/hcil/counterpoint/; accessed on Jan. 25, 2011, 3 pages.

EP Supplemental Search Report in EP Appln. No. 09803312.9, mailed Jul. 7, 2011, 6 pages.

Gallegos et al.; "CounterPoint User Manual" downloaded from archive Org 2005 capture, http://web.archive.org/web/20050205082738/www.cs.umd.edu/hcil/counterpoint/; 21 pages.

Good et al.; "CounterPoint: Creating Jazzy Interactive Presentations"—HCIL Tech Report #2001-03, 9 pages.

International Search Report in PCT Appln. No. PCT/US2006/17725, mailed Jul. 5, 2007, 8 pages.

Microsoft Releases First Beta of "Office 11": Next Version of Office to Connect People, Information and Business Processes, Oct. 2, 2002, 1 page.

Non-Final Office Action in U.S. Appl. No. 12/184,174, mailed Feb. 4, 2011, 19 pages.

Wempen, F., "PowerPoint 2007 Bible"; Feb. 27, 2007, excerpt, 27 pages.

\* cited by examiner

SECTIONS OF A PRESENTATION HAVING USER-DEFINABLE PROPERTIES

BACKGROUND

Electronic presentations are used in a variety of contexts for conveying information. For example, a businessperson may use an electronic slide presentation to convey information about business performance. In another example, a teacher may use an electronic slide presentation to teach a lesson.

Presentation applications executing on personal computers are used to author and present electronic presentations. A typical presentation application presents an authoring interface that enables a user to edit slides in a presentation. The authoring interface may include a primary pane and a navigation pane. The primary pane contains an editable slide in the presentation. The navigation pane may include a series of thumbnail images of each slide in the presentation. A thumbnail image of a slide is a smaller version of the slide. A user of the presentation application can click on a thumbnail image of a slide to cause the primary pane of the authoring interface to display the slide for editing.

Electronic slide presentations may include a large number of slides and may contain information about several topics. For example, a physics teacher may use an electronic slide presentation to teach a lesson that includes slides about resistance, slides about capacitance, and slides about an upcoming exam.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, this disclosure describes techniques that employ user-defined values of properties of sections of an electronic presentation. As described herein, a user may configure a presentation to include a plurality of sections. Each of the sections includes zero or more slides of the electronic slide presentation. In addition to the slides associated with each section, each of the sections is associated with one or more properties having values that can be defined by an author of the presentation. Because the values of the properties of the sections are user-definable, these properties may, in some implementations of these techniques, enable the author of the presentation to use the sections in ways not possible in presentation applications that merely use sections as a means of grouping thumbnail images of slides for easy navigation among slides in an authoring interface.

As described below, the properties of a section may include, for example, a title of the section, a name of an author of the section, a set of access control data that specifies rights of users to perform actions with respect to the section, and other properties. The properties of sections may be used during authoring of the presentation or during presentation of the presentation. The uses of such properties during authoring of a presentation may include, for example, the ability to conceal or reveal thumbnail images of slides in a section by clicking on a title of the section, the ability to reorder sections using titles of the sections, the ability to use the name of a section to print the slides in the section, the ability to create a hyperlink to a section of a presentation, the ability to associate searchable keywords with sections, and other uses. The uses of such properties during presentation of the presentation may, for example, include the ability to view names of sections of a presentation during presentation of the presentation and navigating to a first slide in a section.

DETAILED DESCRIPTION

In general, this disclosure describes techniques that employ user-defined values of properties of sections of an electronic presentation. In the following description, various examples are described. It should be appreciated that these examples are provided for purposes of explanation and not as express or implied limitations on the scopes of the claims.

Figure 1:
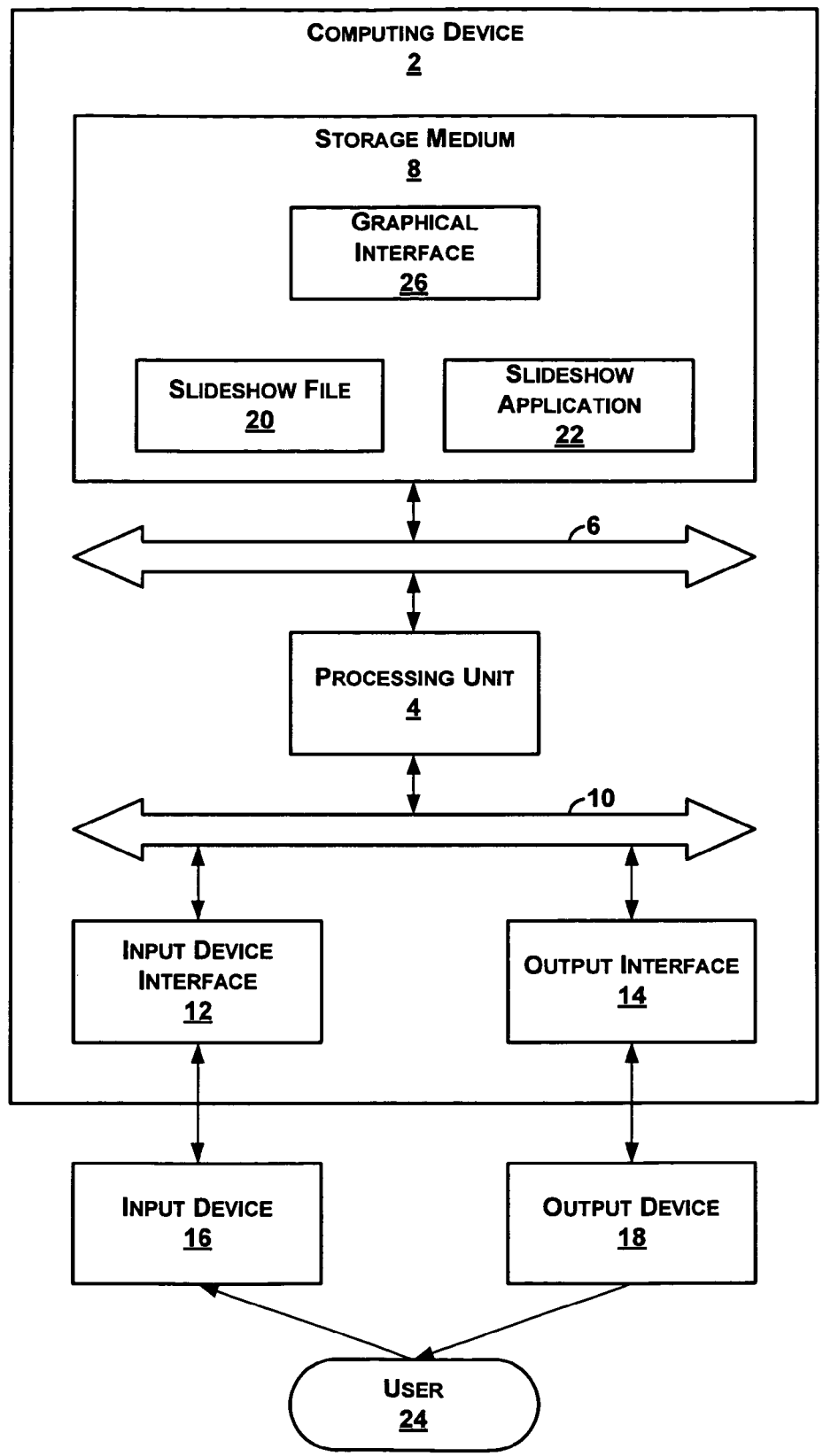
FIG. 1 illustrates an example computing device.

FIG. 1 illustrates an example computing device 2. Computing device 2 may be a wide variety of different types of physical computing devices. For example, computing device 2 may be a personal computer, a laptop computer, a tablet computer, a server computer, a mainframe computer, a mobile telephone, a network telephone, a television set top box, a personal media player, or another type of computing device. Furthermore, computing device 2 may implemented as two or more physically separate "boxes." For example, computing device 2 may be a cluster of two or more physical computing devices. In another example, computing device 2 may be a grid computing system.

As illustrated in the example of FIG. 1, computing device 2 comprises a processing unit 4 that is capable of executing instructions. Processing unit 4 may be implemented as a set of integrated circuits that includes at least one integrated circuit. In one example implementation, processing unit 4 is a Core 2 processor manufactured by Intel Corporation of Santa Clara, Calif. In other example implementations, processing unit 4 is implemented as a plurality of integrated circuits distributed among several physical devices.

The example of FIG. 1 also illustrates that computing device 2 comprises a communication link 6 that enables processing unit 4 to communicate with a storage medium 8. Communication link 6 may be a variety of different types of communications link, including a front-side bus, a HyperTransport link, an Intel QuickPath Interconnect, an Accelerated Graphics Port bus, a computer network link (e.g., one or more Ethernet links, fiber optic links, etc.), a PCI link, or another type of link.

Storage medium 8 is capable of storing instructions that are readable and executable by processing unit 4. Storage medium 8 may be a wide variety of different types of computer-readable storage media. For example, storage medium 8 may be implemented as one or more random access memory units, one or more read-only memory units, magnetic disks, optical disks, magnetic tapes, flash memory units, or other types of storage media. It should be appreciated that the term "storage medium" refers to a collection of one or more storage media units or one or more types of storage media. For instance, some data in storage medium 8 may be physically stored on a magnetic tape and some data in storage medium 8 may be physically stored on a magnetic disk.

In the example of FIG. 1, computing device 2 includes a communication link 10 that enables processing unit 4 to communicate with an input device interface 12 and an output device interface 14. Communication link 10 may be a variety of different types of communications link, including a front-side bus, a HyperTransport link, an Intel QuickPath Interconnect, an Accelerated Graphics Port bus, a computer network link (e.g., one or more Ethernet links, fiber optic links, etc.), a PCI link, or another type of link. Input device interface 10 facilitates communication from an input device 16. Output device interface 14 facilitates communication with an output device 18 that is capable of outputting information to the real world. Input device interface 12 and output device interface 14 may be implemented in a variety of ways. For instance, input device interface 12 and/or output device interface 14 may be implemented as a Universal Serial Bus (USB) interface card, a serial bus card, a network interface (e.g., an Ethernet card, a WiFi adapter, a WiMax adapter, etc.) or another type of physical input device interface. In some instances, the functionality of input device interface 10 and the functionality of output device interface 12 may be implemented by a single physical card.

Input device 16 may be wide variety of different types of devices. For example, input device 16 may be a mouse, a trackball, a touch-sensitive screen, a keyboard, a keypad, or another type of input device.

Output device 18 may also be a wide variety of different types of devices. For example, output device 18 may be a visual display unit such as a cathode ray display screen, a liquid crystal display (LCD) screen, a light-emitting diode (LED) array, a plasma screen, or another type of device that is capable of outputting information to the real world. Processing unit 4 may present information on output device 18 in a variety of ways. For example, processing unit 4 and output device interface 14 may be connected to a motherboard of computing device 2. In this example, a digital visual interface cable, or another type of physical video connector cable, may connect the output device interface 14 and output device 18. In this example, processing unit 4 may send instructions regarding an image to output device interface 14 and output device interface 14 may send signals to output device 18 to display the image. In another example, processing unit 4 may present information on output device 18 by transmitting information over a network to a computing device that causes output device 18 to display an image based on the transmitted information.

Storage medium 8 stores a presentation file 20 that represents an electronic presentation. Presentation file 20 contains at least one set of section data. Each set of section data in presentation file 20 defines a section. A "section" is a logical unit of an electronic presentation that has at least one property having a user-definable value and that is associated with zero or more sequential or non-sequential slides of the presentation. Each set of section data identifies a set of slides associated with a section and a user-defined value of a property of the section other than the set of slides included in the section. As discussed below, the property of the section may be a variety of different properties and that a set of section data may include several user-defined values of properties of a section. For example, a first set of section data may contain data that directly represents six slides included in a first section and may contain data that indicates that the name of the first section is "Section 1." Further, in this example, a second set of section data in presentation file 20 may contain data that directly represents four slides and may contain data that indicates that the name of the second section is "Section 2." In this example, the first section may include slides 1, 3, 5, 6, 7, and 9 and the second section may include slides 2, 4, 8, and 10.

Presentation file 20 may include a wide variety of different types of data structures that embody the sets of section data. For example, presentation file 20 may include an extensible markup language (XML) data structure for each set of section data. In another example, presentation file 20 may include binary data structures that represent each set of section data. In another example, presentation file 20 may include a set of section data that identifies the first set of slides and identifies the data that specifies the user-defined value of the property of the first section by specifying a link to a third set of section data contained in a second presentation file. In this example, the third set of section data identifies the first set of slides and identifies data that specifies the user-defined value of the property of the first section by containing data that directly represents the first set of slides and by containing data that directly represents the user-defined value of the property of the first presentation.

In addition to presentation file 20, storage medium 8 stores a presentation application 22. Presentation application 22 may be similar in some respects to presentation applications such as the Microsoft POWERPOINT® presentation graphics program sold by Microsoft Corporation of Redmond, Wash., the KEYNOTE® slide presentation software sold by Apple Corporation of Cupertino, Calif., the OpenOffice Impress slide presentation software provided by OpenOffice.org, and the GOOGLE APPS® slide presentation application provided by Google, Inc. of Mountain View, Calif.

In one example implementation, presentation application 22 comprises a set of instructions that are executable by processing unit 4. When a user 24 wants to interact with the electronic presentation represented by presentation file 20, user 24 may use input device 16 to instruct computing device 2 to begin executing the instructions of presentation application 22. For example, user 24 may instruct computing device 2 to begin executing instructions of presentation application 22 by using a mouse to select an icon displayed on output device 18 that represents presentation application 22. In another example, user 24 may instruct computing device 2 to begin executing instructions of presentation application 22 by using a keyboard to select an icon representing presentation file 20.

When processing unit 4 begins executing the instructions of presentation application 22, the instructions cause processing unit 4 to access presentation file 20. Upon accessing presentation file 20, the instructions of presentation application 22 cause processing unit 4 to generate a graphical interface 26 in storage medium 8. When processing unit 4 generates graphical interface 26, processing unit 4 uses the values of the properties of the sections of the presentation. Graphical interface 26, when displayed on output device 18 enables a user 24 to interact with an electronic presentation that includes the slides in each of the sections defined by the sets of section data included in presentation file 20. After causing processing unit 4 to generate graphical interface 26, the instructions of presentation application 22 cause processing unit 4 to display graphical interface 26 on output device 18.

Figure 2:
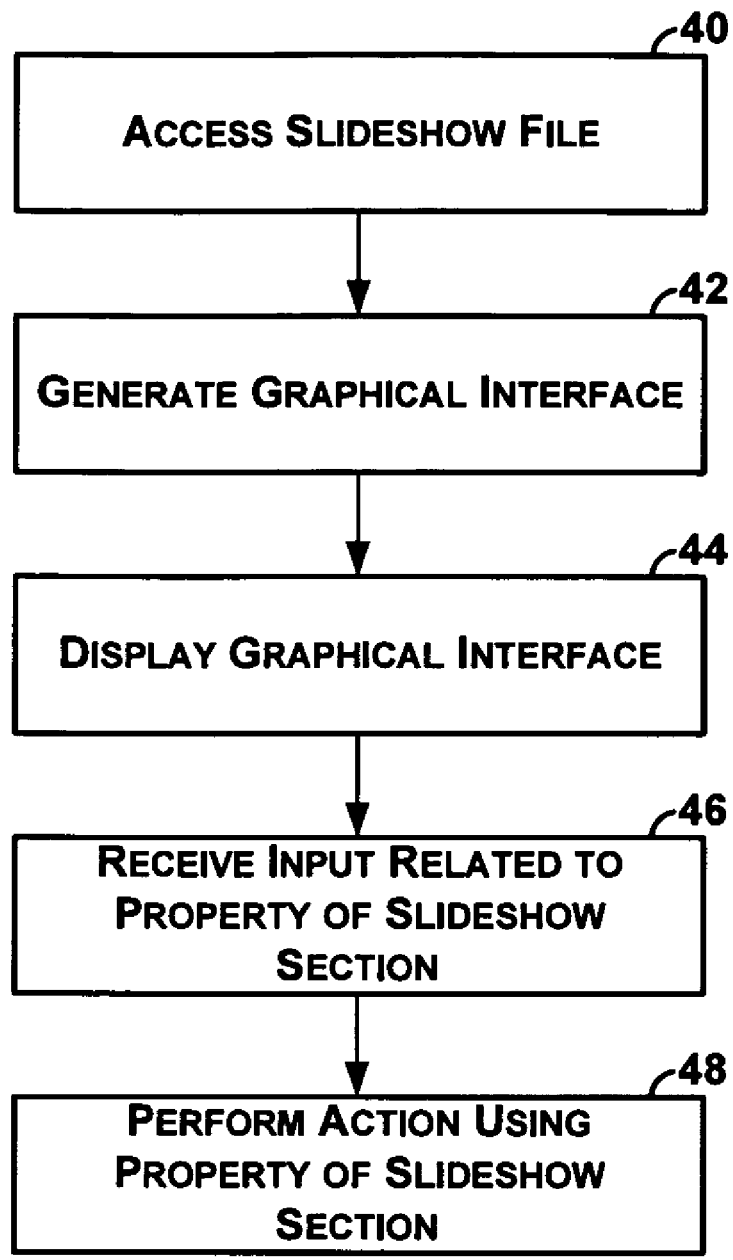
FIG. 2 illustrates an example operation that instructions of a presentation application may cause a processing unit of the computing device to perform.

FIG. 2 illustrates a first example operation that instructions of presentation application 22 may cause processing unit 4 of computing device 2 to perform. When processing unit 4 begins executing the instructions of presentation application 22, the instructions cause processing unit 4 to access presentation file 20 (40). In other words, the instructions cause processing unit 4 to retrieve some or all of presentation file 20 from storage medium 8. As described above, presentation file 20 contains at least one set of section data. Each set of section data identifies a set of zero or more slides included in a section and a user-defined value of a property of the section other than the set of slides included in the section. For example, presentation file 20 may contain: (i) a first set of section data that defines a first section, the first set of section data identifying a first set of slides and identifying data that specifies a user-defined value of a property of the first section other than the first set of slides, and (ii) a second set of section data that defines a second section, the second set of section data identifying a second set of slides and identifying data that specifies a user-defined value of a property of the second section other than the second set of slides.

After the instructions of presentation application 22 cause processing unit 4 to access presentation file 20, the instructions of presentation application 22 cause processing unit 4 to generate graphical interface 26 using at least one user-defined value of a property of one of the sections (42). Continuing the example cited in the previous paragraph, the instructions of presentation application 22 may cause processing unit 4 to generate graphical interface 26 using the value of property of the first section and the value of the property of the second section. Once processing unit 4 generates graphical interface 26, the instructions of presentation application 22 cause processing unit 4 to display graphical interface 26 on output device 18 (44).

As mentioned above, graphical interface 26 is designed to enable user 24 to interact with a presentation that includes slides in the sections contained in presentation file 20. Accordingly, when output device 18 displays graphical interface 26, the instructions of presentation application 22 enable processing unit 4 to receive input related to a property of a section in the presentation (46). For example, the instructions of presentation application 22 may enable processing unit 4 to receive mouse movement and mouse click input. In response to the input, the instructions of presentation application 22 cause processing unit 4 to perform an action using the property of the section (48).

The instructions of presentation application 22 may cause processing unit 4 to generate graphical interface 26 in a wide variety of ways, thereby enabling a wide variety of possible ways that user 24 can interact with the presentation. Furthermore, because the instructions of presentation application 22 may cause processing unit 4 to generate graphical interface 26 in a wide variety of ways, processing unit 4 may be receive a wide variety of inputs in step 46 and may perform a wide variety of actions in response to these inputs in step 48. Some of the potential ways of generating graphical interface 26 to enable specific types of interaction are summarized with reference to FIGS. 3-8.

Figure 3:
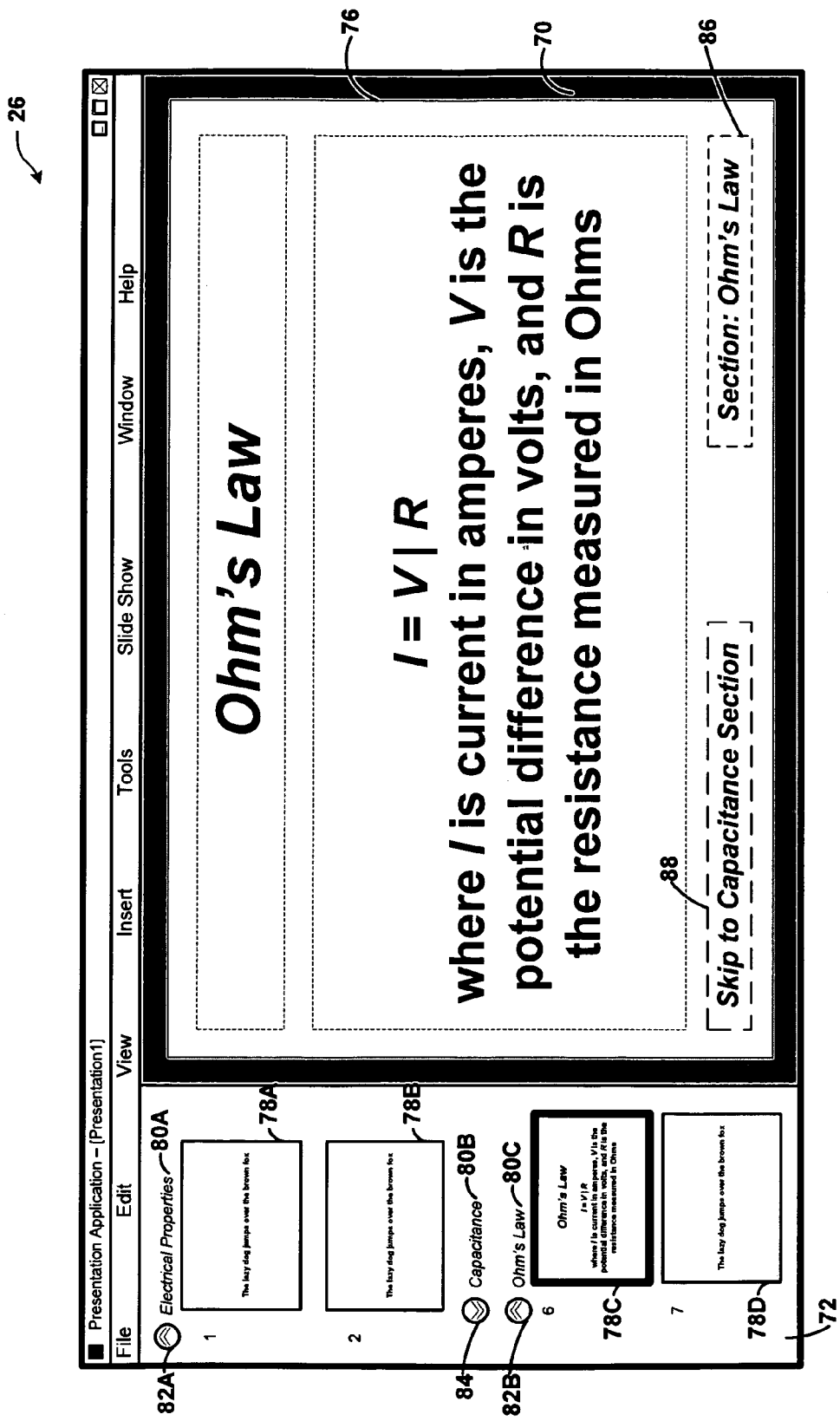
FIG. 3 illustrates an example graphical interface generated by the presentation application for authoring a presentation.

In a first example, presentation file 20 includes sets of section data that contain user-defined values of title properties of the sections of the presentation. Referring to FIG. 3, the instructions of presentation application 22 cause processing unit 4 to generate graphical interface 26 such that graphical interface 26 includes a primary pane 70 and a navigation pane 72. Primary pane 70 contains an editable slide 76 in the presentation. Navigation pane 72 includes a series of thumbnail images 78A through 78D (collectively, "thumbnail images 78") of slides in the presentation. In addition to thumbnail images 78, navigation pane 72 includes the values of the title properties 80A-80C (collectively, "titles 80") of the sections of the presentation. Thumbnail images of slides within a section are shown below the value of the title property of the section. For instance, in the example of FIG. 3, thumbnail images 78A and 78B are shown below the title "Electrical Properties" indicating that the slides represented by thumbnail images 78A and 78B are within a section having the title property "Electrical Properties." Similarly, thumbnail images 78C and 78D are shown below the title "Ohm's Law" indicating that the slides represented by thumbnail images 78C and 78D are within the section having the title property "Ohm's Law."

The example interface in FIG. 3 also illustrates that a first section may be a child section of a second section. When a first section is a child section of a second section, all slides in the first section are slides in the section, but all slides in the second section are not necessarily slides in the first section. In the example of FIG. 3, the section having the title property "Ohm's Law" is a child section of the section having the title property "Electrical Properties." The fact that the section having the title property "Ohm's Law" is a child section of the section having the title property "Electrical Properties" is demonstrated visually by the indentation of the title "Ohm's Law" relative to the title "Electrical Properties" and the indentation of the thumbnail images of the slides in the section having the title property of "Ohm's Law" relative to slides in the section having the title property "Electrical Properties."

The example interface in FIG. 3 also includes conceal icons 82A and 82B (collectively, "conceal icons 82"). When graphical interface 26 is displayed on output device 18, user 24 may use input device 14 to select one of conceal icons 82. When user 24 selects conceal icon 82A, processing unit 4 receives section concealment input that indicates that user 24 wants to conceal the thumbnail images of slides in the section having the title property "Electrical Properties." Note that in the example of FIG. 3, the slides in the section having the title property "Electrical Properties" include all slides in the section having the title property "Ohm's Law" and all slides in the section having the title property "Capacitance." In response to the section concealment input, the instructions of presentation application 22 cause processing unit 4 to update graphical interface 26 such that graphical interface 26 does not include any thumbnail images of slides in the section having the title property "Electrical Properties" (i.e., thumbnail images 78A, 78B, 78C, and 78D). The instructions of presentation application 22 may also cause processing unit 4 to update graphical interface 26 such that graphical interface 26 does not include the titles of any sections that are child sections of the section having the title property "Electrical Properties" (i.e., "Capacitance" and "Ohm's Law"). The instructions of presentation application 22 also cause processing unit 4 to display the updated graphical interface on output device 18.

The example interface in FIG. 3 also includes a reveal icon 84. The instructions of presentation application 22 may cause processing unit 4 to display a reveal icon next to a title of a section in which the thumbnail image of slides in the section are concealed. When user 24 selects reveal icon 84, processing unit 4 receives section reveal input that indicates that user 24 wants to reveal the thumbnail images of slides in the section having the title property "Capacitance." In response to the section reveal input, the instructions of presentation application 22 cause processing unit 4 to update graphical interface 26 such that graphical interface 26 includes thumbnail images of slides in the section having the title "Capacitance." The instructions of presentation application 22 then cause processing unit 4 to display the updated graphical interface on output device 18.

The example interface of FIG. 3 also includes an auto-update field 86 within slide 76. Auto-update field 86 contains the value of the title property of the section to which slide 76 belongs. In the example of FIG. 3, slide 76 belongs to the section having the title "Ohm's Law." When user 24 elects to change the value of the title property of the section to which slide 76 belongs, processing unit 4 receives title change input that indicates a new title for the section. In response to the title change input, the instructions of presentation application cause processing unit 4 to update the value of the title property displayed in auto-update field 86. It should be understood that other auto-update fields may contain values of other properties of sections. For instance, an auto-update field in a slide of a section may contain the name specified by an "author" property of the section. In this instance, if user 24 elected to change the value of the "author" property of the section, the instructions of presentation application 22 cause processing unit 4 to automatically update the name contained in the auto-update field.

The example interface of FIG. 3 also includes a link 88. During presentation of the presentation, user 24 may select link 88 in order to jump to the sequentially first slide in a presentation selection referenced by link 88. In the example of FIG. 3, selection on link 88 may cause processing unit 4 to display the sequentially first slide in the section titled "Capacitance."

User 24 can use the example interface of FIG. 3 to interact with the presentation in additional ways. For example, user 24 may use input device 14 to select a section by selecting the title (e.g., title 80C) of the section in navigation pane 72. When user 24 selects one of titles 80, processing unit 4 receives section selection input that indicates that user 24 has selected the section associated with the selected one of titles 80. In response to the section selection input, the instructions of presentation application 22 cause processing unit 4 to update graphical interface 26 such that the thumbnail images of the slides in the selected section are visually differentiated from the thumbnail images of the slides in the non-selected sections. For example, the thumbnail images of the slides in the selected section may be visually differentiated from the thumbnail images of the slides in the non-selected sections by a thicker border around the thumbnail images of the slides in the selected section.

When user 24 has selected a section, processing unit 4 may receive copy command input from user 24 and may subsequently receive paste command input from user 24. In response to the paste command input, the instructions of presentation application 22 cause processing unit 4 to copy the presentation data that defines the selected section to a location indicated by the paste command input. For instance, when the paste command input indicates a location in a second presentation, the instructions of presentation application 22 may cause processing unit 4 to copy the set of presentation data that defines the selected section to a location in the second presentation. As a result, the second presentation includes the selected section, including the data identifying the slides in the selected section and values of properties of the selected section. The copy command input may take the form of user 24 clicking on the title of a section of the presentation and the paste command input may take the form of user 24 dragging the title of the section to a location and "dropping" the title of the section at a location where the section is to be added.

Figure 4:
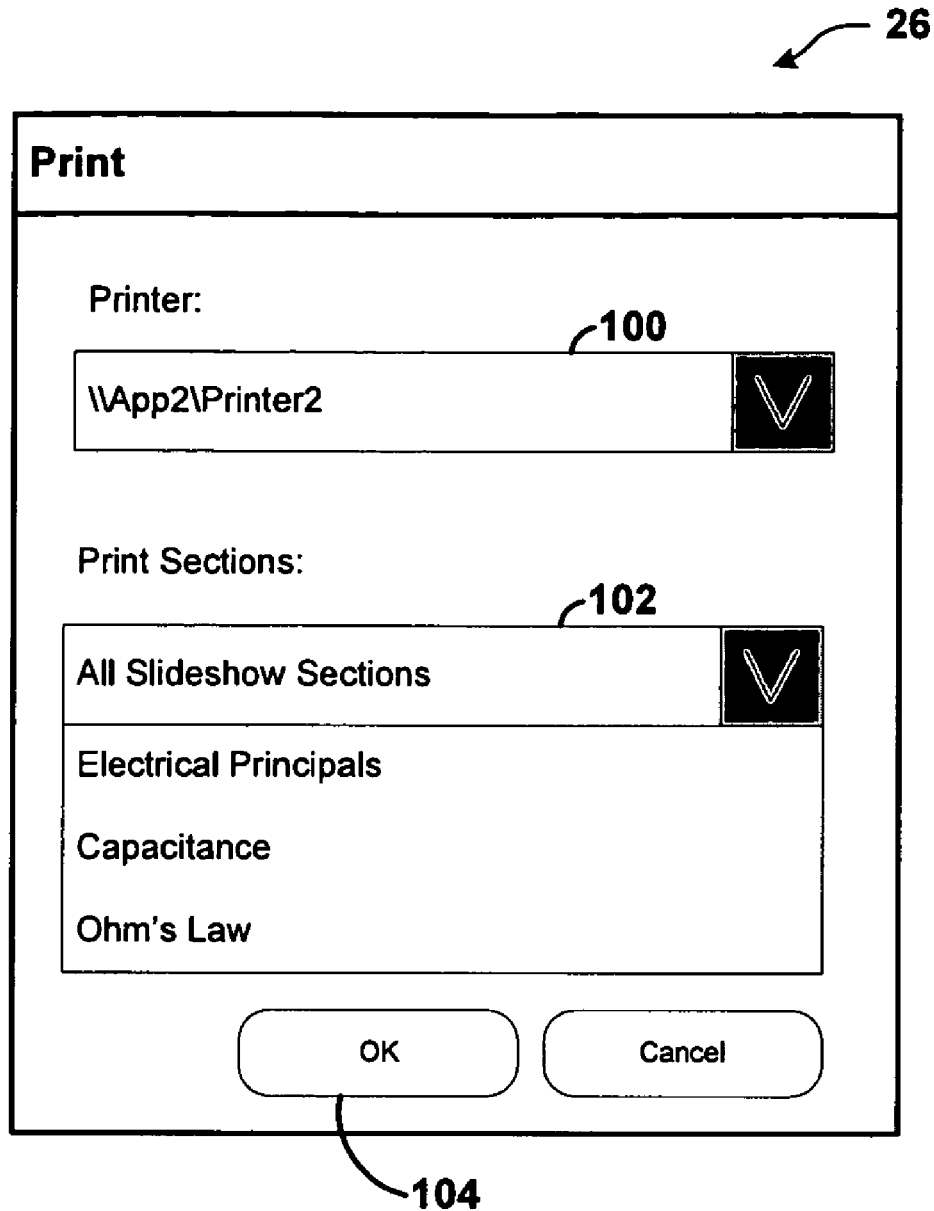
FIG. 4 illustrates an example graphical interface generated by the presentation application for printing slides in the presentation.

FIG. 4 illustrates a second example version of graphical interface 26 generated by processing unit 4 for printing slides in the presentation. In the example of FIG. 4, graphical interface 26 is a print dialog window. The instructions of presentation application 22 may cause processing unit 4 to display graphical interface 26 in response to an input from user 24 that indicates that user 24 wants to print slides in the presentation. As illustrated in the example of FIG. 4, graphical interface 26 includes a "Printer" drop box 100 that enables user 24 to select a printer with which to print the slides of the presentation. Furthermore, as illustrated in the example of FIG. 4, graphical interface 26 includes a "Print Sections" drop box 102. User 24 may interact with "Print Sections" drop box 102 to indicate that user 24 wants to print slides in all sections of the presentation or that user 24 wants to print slides only in a selected section of the presentation. When user 24 interacts with "Print Sections" drop box 102, processing unit 4 may receive section selection input that indicates one or more of the sections as selected sections. Furthermore, as illustrated in the example of FIG. 4, graphical interface 26 includes an "OK" button 104. When user 24 uses input device 14 to select "OK" button 104, processing unit 4 instructs the printing device indicated by "Printer" drop box 100 to print the slides in the selected sections.

Figure 5:
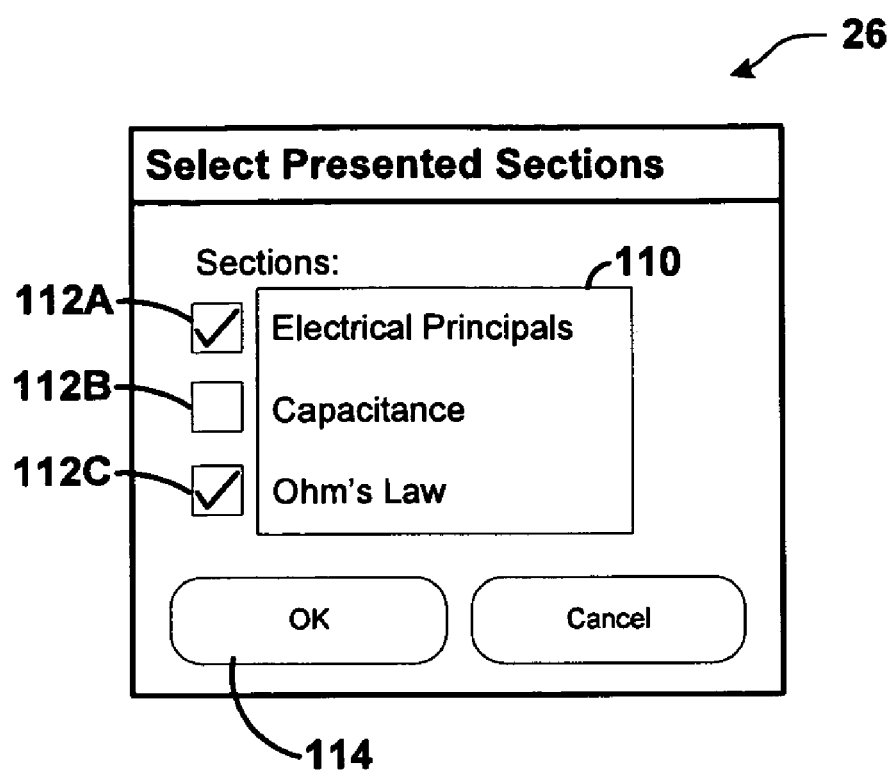
FIG. 5 illustrates an example graphical interface generated by the processing unit to select sections to include in a presentation of the presentation.

FIG. 5 illustrates a third example version of graphical interface 26 generated by processing unit 4 that enables user 24 to select sections to display in a presentation of the presentation. As illustrated in the example of FIG. 5, graphical interface 26 is a section selection dialog window. The instructions of presentation application 22 may cause processing unit 4 to display graphical interface 26 in response to an input from user 24 that indicates that user 24 wants to select sections of the presentation to be displayed in a presentation of the presentation. In the example of FIG. 5, graphical interface 26 includes a list 110 of the values of the title properties of the sections in the presentation. In addition, graphical interface 26 includes checkboxes 112A-112C (collectively, "checkboxes 112") next to each of the values of the title properties of the sections in the presentation. A checkmark in one of checkboxes 112 next to a value of the title property of one of the sections indicates that a property of the section specifies that the slides of the section are to be included in a presentation of the presentation. In the example of FIG. 5, there are checkmarks in checkboxes 112A and 112B, indicating that slides in the section titled "Electric Properties" and slides in the section titled "Ohm's Law" are to be included in a presentation of the presentation and that the slides in the section titled "Capacitance" are not to be included in the presentation of the presentation.

User 24 may use input device 14 to add or remove checkmarks from checkboxes 112. When user 24 adds a checkmark to one of checkboxes 112, processing unit 4 receives section selection input that indicates that user 24 wants slides in the section associated with the one of checkboxes 112 to be included in the presentation of the presentation. In response to the section selection input, processing unit 4 modifies the value of property of the presentation selection to indicate that the slides of the section are to be included in presentations of the presentation.

Later, processing unit 4 may receive input that indicates that user 24 wants to present the presentation. In response to this input, the instructions of presentation application 22 may cause processing unit 4 to use the value of the property of the selected section to determine whether to display the slides of the selected section. Subsequently, the instructions of presentation application 22 may cause processing unit 4 to generate a presentation graphical interface that includes a slide of the selected section when it is determined that the value of the property of the selected section indicates that the slides of the selected section are to be displayed in the presentation of the presentation. The instructions of presentation application 22 may then cause processing unit 4 to display the presentation graphical interface on output device 18. In this way, sections can be skipped seamlessly during presentation of the presentation.

Figure 6:
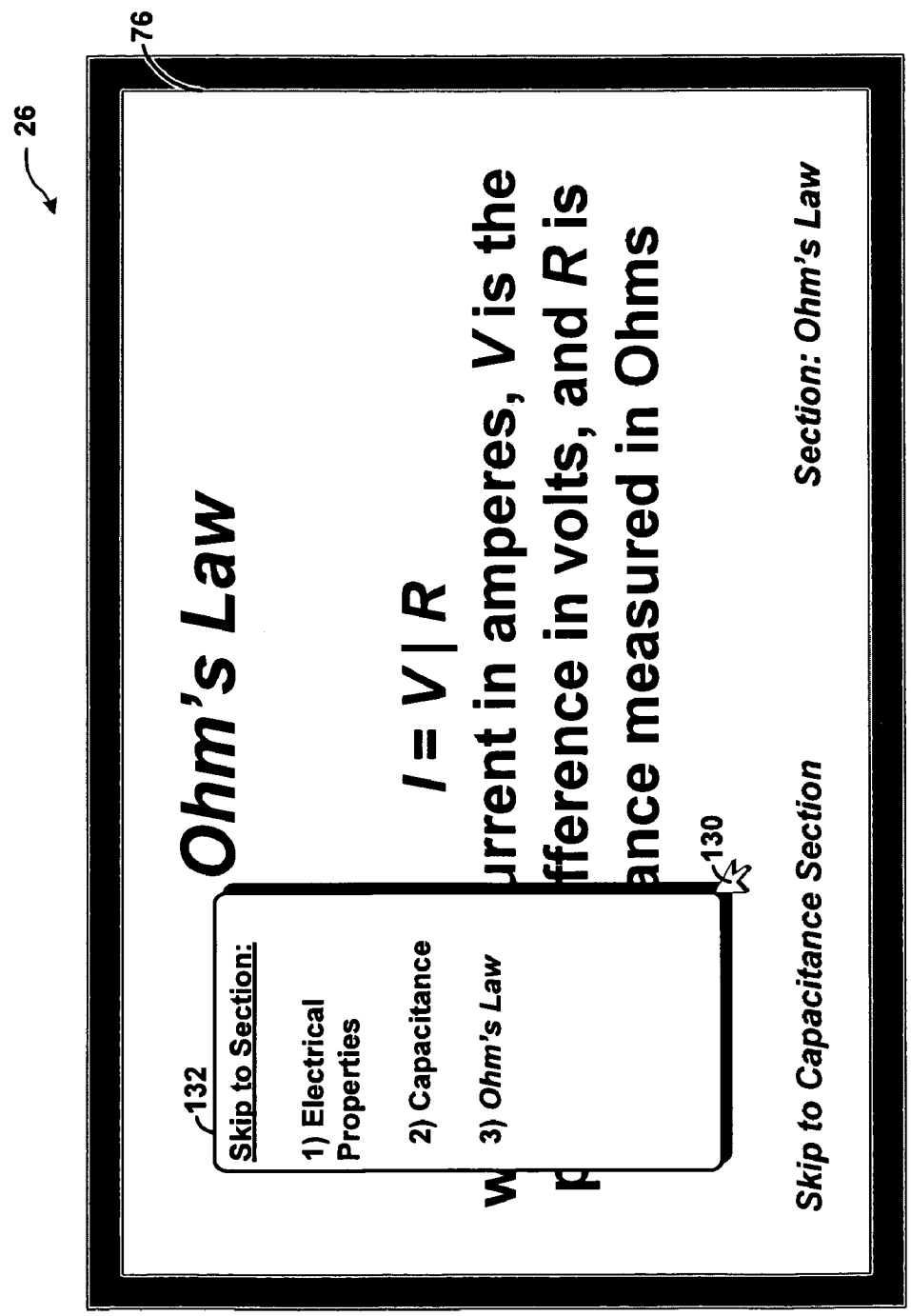
FIG. 6 illustrates an example graphical interface generated by the processing unit for presenting the presentation.

FIG. 6 illustrates a fourth example version of graphical interface 26 generated by processing unit 4 for presenting the presentation. As illustrated in the example of FIG. 6, graphical interface 26 includes slide 76 (FIG. 3). Furthermore, graphical interface 26 shows a pointer 130 controlled by user 24 using input device 14. User 24 may use input device 14 to indicate that user 24 wants to skip to a different section of the presentation. For example, user 24 may press a right mouse button of input device 14. When user 24 indicates that user 24 wants to skip to a different section of the presentation, processing unit 4 updates graphical interface 26 such that graphical interface 26 includes a menu 132 that lists the values of the title properties of the sections of the presentation. User 24 may then position pointer 130 to indicate that user 24 wants to skip to a particular section of the presentation. When user 24 indicates that user 24 wants to skip to a selected section of the presentation, processing unit 4 receives section selection input that indicates that user 24 wants output device 18 to display a sequentially first slide in the selected section. In response to the section selection input, the instructions of presentation application 22 cause processing unit 4 to update graphical interface 26 such that graphical interface 26 includes an image of the sequentially first slides in the selected section and causes processing unit 4 to display the updated graphical interface on output device 18.

Figure 7:
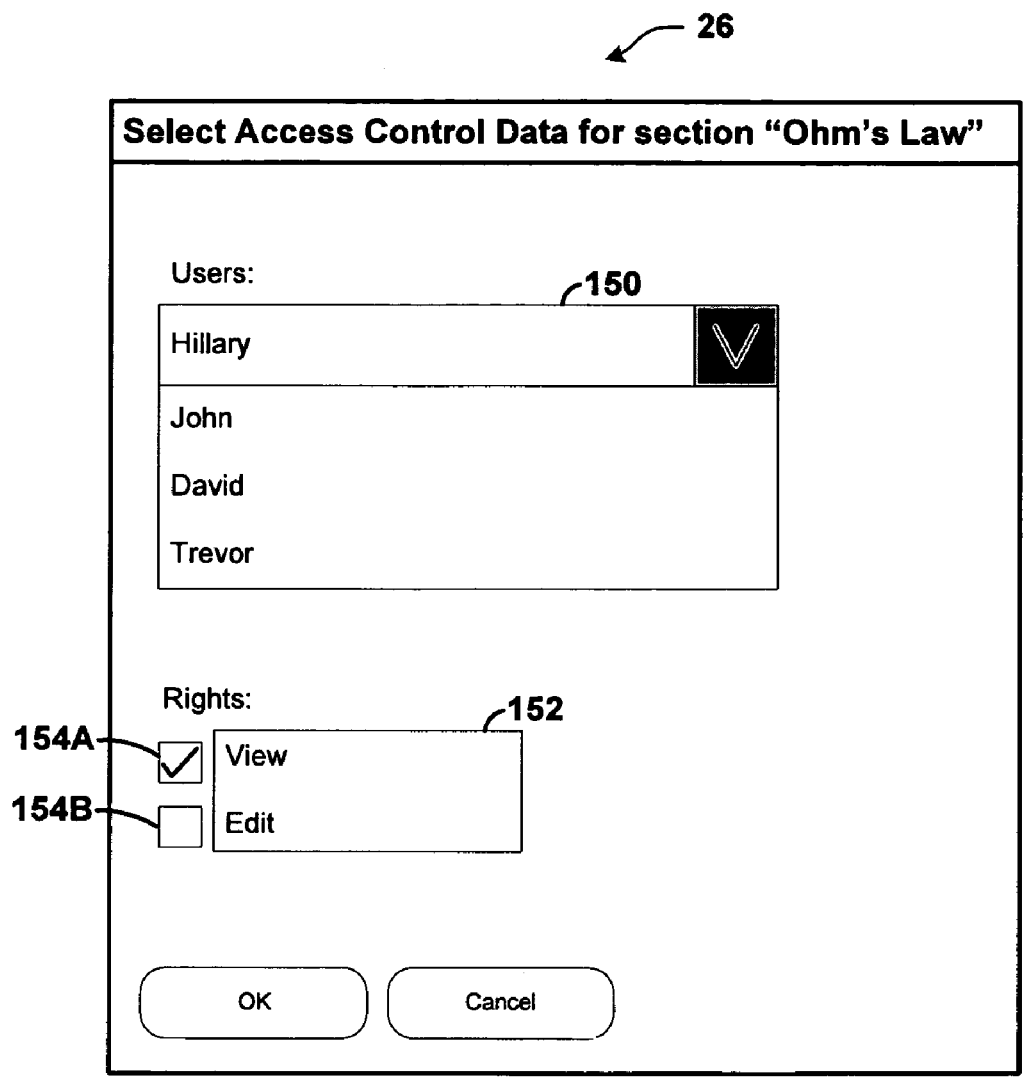
FIG. 7 illustrates an example graphical interface generated by the processing unit for defining access control data properties of a section of the presentation.

FIG. 7 illustrates a fifth example version of graphical interface 26 generated by processing unit 4 for defining access control data properties of a section of the presentation. In the example of FIG. 7, graphical interface 26 enables user 24 to select access control data for the section titled "Ohm's Law." Specifically, graphical interface 26 includes a "users" drop box 150 that enables user 24 to select another user. For instance, in the example of FIG. 7, user 24 may select users named "Hillary," "John," "David," or "Trevor." In addition, graphical interface 26 includes a list of rights 152. In the example of FIG. 7, list of rights 152 includes a right to view slides in the section titled "Ohm's Law" and a right to edit slides in the section titled "Ohm's Law." Furthermore, graphical interface 26 includes a checkbox 154A and a checkbox 154B. A checkmark in checkbox 154A indicates a property of the section titled "Ohm's Law" has a value that specifies that the user selected in "users" drop box 150 has the right to view slides in the section titled "Ohm's Law." A checkmark in checkbox 154B indicates a property of the section titled "Ohm's Law" has a value that specifies that the user selected in "users" drop box 150 has the right to edit slides in the section titled "Ohm's Law." User 24 may redefine the values of these properties by clicking on checkbox 154A and/or checkbox 154B.

It should be appreciated that values of these properties for a single user may differ among sections of the presentation. For instance, the value of the property of a first section represents a first set of access control data that specifies that a user has a right to perform an action with respect to the first section and the value of the property of the second section represents a second set of access control data that specifies that the user does not have the right to perform the action with respect to the second section.

Subsequently, processing unit 4 may receive a request from a user to perform an action (e.g., view or edit a slide) with respect to a section in the presentation. In response to receiving the request from the user to perform the action with respect to the section of the presentation, the instructions of presentation application 22 cause processing unit 4 to use these properties of the section to determine whether the user has a right to perform the action with respect to the section. If the user has the right to perform the action with respect to the section, the instructions of presentation application 22 cause processing unit 4 to perform the action. If the user does not have the right to perform the action with respect to the section, the instructions of presentation application 22 cause processing unit 4 to deny the request to perform the action.

Figure 8:
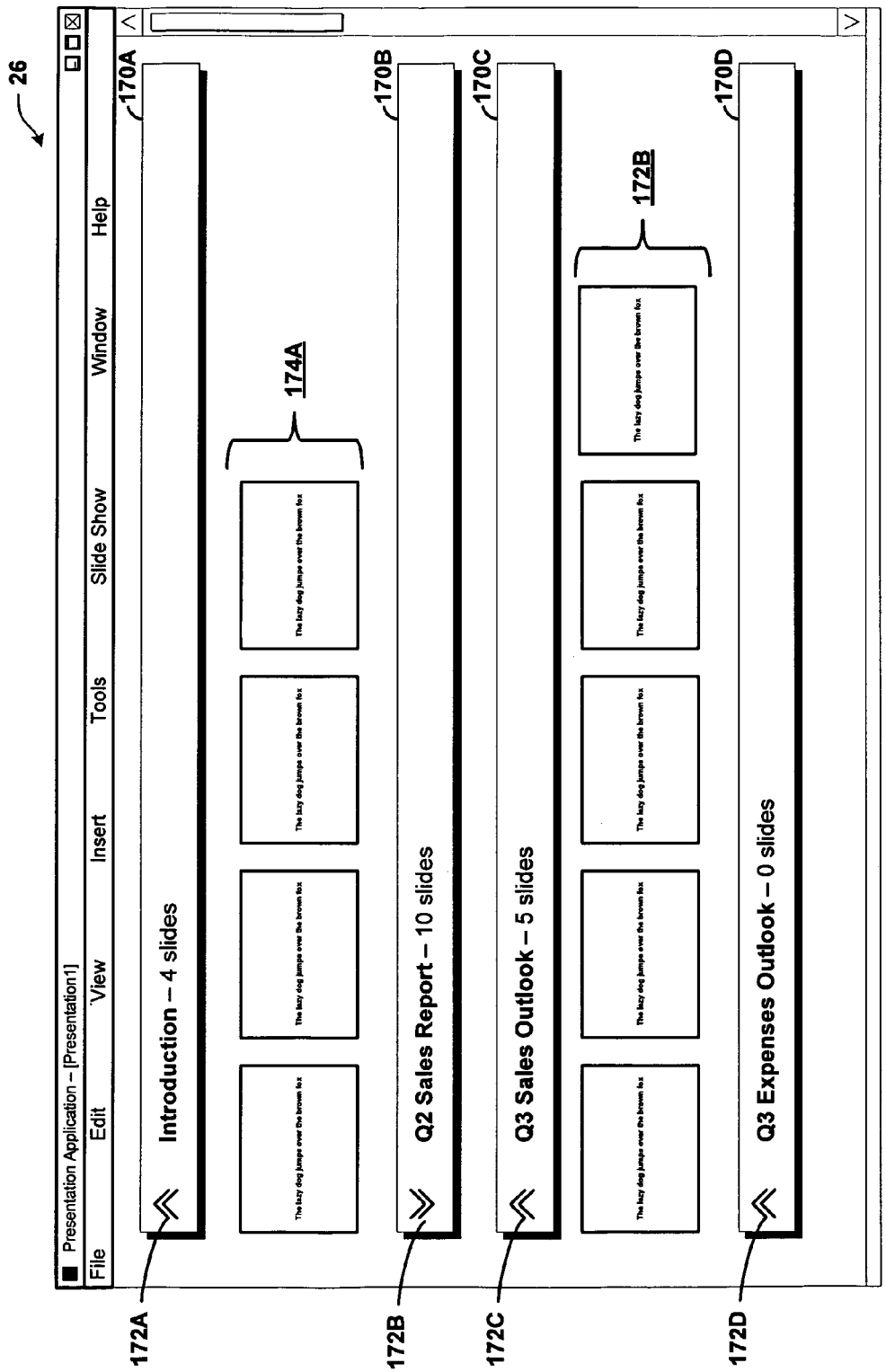
FIG. 8 illustrates a sixth example version of graphical interface 26 generated by processing unit 4 for sorting slides.

FIG. 8 illustrates a sixth example version of graphical interface 26 generated by processing unit 4 for sorting slides. As illustrated in the example of FIG. 8, graphical interface 26 includes title bars 170A, 170B, 170C, and 170D (collectively, "title bars 170"). Title bars 170 include the values of title properties of sections in a presentation. In the example of FIG. 8, title bar 170A indicates that "Introduction" is the value of a title property of a first section of a presentation, title bar 170B indicates that "Q2 Sales Report" is the value of a title property of a second section of the presentation, title bar 170C indicates that "Q3 Sales Outlook" is the value of a title property of a third section of the presentation, and title bar 170D indicates that "Q3 Expenses Outlook" is the value of a title property of a fourth section of the presentation. Title bars 170 also indicate how many slides are in each of the sections of the presentation.

Title bars 170 include icons 172A, 172B, 172C, and 172D (collectively, "icons 172") that enable user 24 to conceal or reveal thumbnail images of slides. In the example of FIG. 8, graphical interface 26 includes a set of thumbnail images 174A beneath title bar 170A that includes thumbnail images in the first section of the presentation. In addition, in the example of FIG. 8, graphical interface 26 includes a set of thumbnail images 174B beneath title bar 170C that includes thumbnail images in the third section of the presentation. User 24 may conceal thumbnail images 174A by selecting icon 172A and may conceal thumbnail images 174B by selecting icon 172C. User 24 may reveal a set of thumbnail images of the slides in the second section of the presentation by selecting icon 172B. Because the fourth section of the presentation does not include any slides, graphical interface 24 does not display any thumbnail images beneath title bar 170D.

User 24 may use this version of graphical interface 24 to organize slides of the presentation into sections. For example, user 24 may use input device 14 to select one of thumbnail images 174A. User 24 may then drag the selected thumbnail image of the slide to an area of graphical interface 26 beneath one of title bars 170. When user 24 has dragged the thumbnail image of the slide to the area of graphical interface 26 beneath one of title bars 170, the slide is removed from the first section added to the section of the presentation associated with the title bar. For instance, user 24 drags the selected thumbnail image of the slide to an area of graphical interface 26 beneath title bar 170D, the slide is removed from the first section and added to the fourth section.

User 24 may interact with the presentation in a variety of ways by selecting title bars 170. For instance, by selecting title bars 170, user 24 may change the values of the title properties of the sections of the presentation. In another instance, by selecting title bars 170, user 24 may add a set of keywords that enable a search engine to identify a section within the presentation. In each of these instances, when user 24 selects one of title bars 170, processing unit 4 receives input and the instructions of presentation application 22 cause processing unit 4 to perform an action in response.

Figure 9:
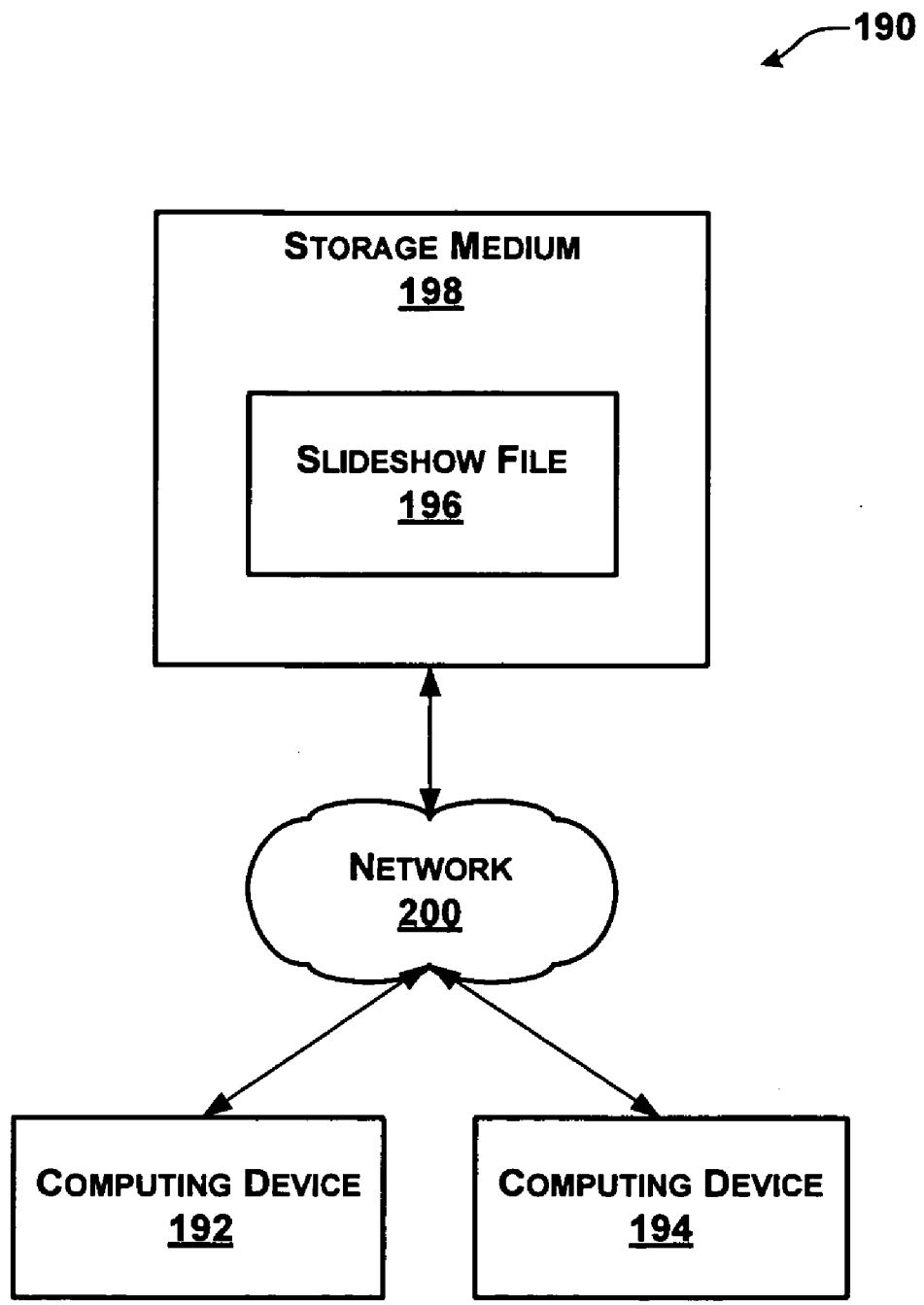
FIG. 9 illustrates an example system in which multiple computing devices simultaneously access a presentation file stored in a storage medium accessible by a network.

FIG. 9 illustrates an example system 190 in which multiple computing devices 192 and 194 simultaneously access a presentation file 196 stored in a storage medium 198 accessible by a network 200. In system 190, presentation file 196 may include a first set of section data that defines a first section and a second set of section data that defines a second section. Because the first set of section data and the second set of section data are logically distinct within presentation file 196, a user of computing device 192 may edit slides in the first section of the presentation at the same time that a user of computing device 194 is editing slides in the second section of the presentation. This may enable these users to work on the presentation in a collaborative fashion.

It is to be understood that the implementations described herein may be implemented by hardware, software, firmware, middleware, microcode, or any combination thereof. When the systems and/or methods are implemented in software, firmware, middleware or microcode, program code or code segments, they may be stored in a computer-readable storage medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

Furthermore, it is to be understood that computing device 2 may have additional features or functionality. For example, computing device 2 may also include additional data storage devices (removable and/or non-removable) such as, for example, magnetic disks, optical disks, or tape. Computer-readable storage media may include volatile and nonvolatile, removable and non-removable media implemented in any method or technology for storage of information, such as computer readable instructions, data structures, program modules, or other data.

For a software implementation, the techniques described herein may be implemented with modules (e.g., procedures, functions, and so on) that perform the functions described herein. The software codes and instructions may be stored in computer-readable storage media and executed by processors. The memory unit may be implemented within the processor or external to the processor, in which case it can be communicatively coupled to the processor via various means as is known in the art.

These techniques may be realized in several ways. For example, these techniques may be conceptualized as a method for organizing slides of an electronic slide presentation. The method comprises accessing, with a computing device, a presentation file stored on a computer-readable storage medium, the presentation file containing: (i) a first set of section data that defines a first section, the first set of section data identifying a first set of slides and identifying data that specifies a user-defined value of a property of the first section other than the first set of slides, and (ii) a second set of section data that defines a second section, the second set of section data identifying a second set of slides and identifying data that specifies a user-defined value of a property of the second section other than the second set of slides. The method also comprises generating, at the computing device, a graphical interface using the value of the property of the first section and the value of the property of the second section, the graphical interface enabling a user to interact with an electronic presentation that includes the slides in the first set of slides and the slides in the second set of slides. In addition, the method comprises displaying the graphical interface on an output device.

In another example, the techniques of this disclosure may be realized as a computing device comprising a processing unit that is capable of executing instructions, an output device, and a storage medium. The storage medium comprises a presentation file stored on a computer-readable storage medium, the presentation file containing: (i) a first set of section data that defines a first section, the first set of section data identifying a first set of slides and identifying data that specifies a user-defined value of a property of the first section other than the first set of slides, and (ii) a second set of section data that defines a second section, the second set of section data identifying a second set of slides and identifying data that specifies a user-defined value of a property of the second section other than the second set of slides. The computer-readable storage medium also comprises instructions that, when executed by the processing unit, cause the processing unit to: access the presentation file; generate a graphical interface using the value of the property of the first section and the value of the property of the second section, the graphical interface enabling a user to interact with an electronic presentation that includes the slides in the first set of slides and the slides in the second set of slides; and display the graphical interface on the output device.

In another example, the techniques of this disclosure may be realized as a computer-readable storage medium comprising a presentation file stored on a computer-readable storage medium, the presentation file containing: (i) a first set of section data that defines a first section, the first set of section data identifying a first set of slides, identifying data that specifies a title of the first section, and identifying data that specifies a user-defined value of a property of the first section that represents a first set of access control data that specifies that the user has a right to perform an action with respect to the first section, and (ii) a second set of section data that defines a second section, the second set of section data identifying a second set of slides, identifying data that specifies a title of the second section, and identifying data that specifies a user-defined value of a property of the second section that represents a second set of access control data that specifies that the user does not have the right to perform the action with respect to the second section. The computer-readable storage medium also comprises instructions that, when executed by a processing unit of a computing device, cause the processing unit to access the presentation file. The instructions also cause the processing unit to generate a graphical interface that displays the title of the first section and the title of the second section. Furthermore, the instructions cause the processing unit to receive a request from the user to perform the action with respect to the first section. The instructions also cause the processing unit to, in response to receiving the request from the user to perform the action with respect to the first section, determine that the second set of access control data specifies that the user does not have the right to perform the action with respect to the second section; and perform the action with respect to the first section. In addition, the instructions cause the processing unit to receive a request from the user to perform the action with respect to the second section. Furthermore, the instructions cause the processing unit to, in response to receiving the request from the user to perform the action with respect to the second section, determine that the second set of access control data specifies that the user does not have the right to perform the action with respect to the second section and deny the request to perform the action with respect to the second section.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for organizing slides of an electronic slide presentation, the method comprising:
    accessing, by a computing device, a presentation file for the electronic slide presentation, the presentation file stored on a computer-readable storage medium, the presentation file containing:
        a first set of section data, the first set of section data defining a first section of the electronic slide presentation, the first set of section data identifying slides in the first section of the electronic slide presentation and identifying a user-defined title of the first section, and
        a second set of section data, the second set of section data defining a second section of the electronic slide presentation, the second set of section data identifying slides in the second section of the electronic slide presentation and identifying a user-defined title of the second section;
    generating, by the computing device, a graphical interface including the title of the first section, thumbnail images of the slides in the first section, the title of the second section, and thumbnail images of the slides in the second section; and
    displaying the graphical interface on an output device:
    wherein the first set of section data identifies a first set of access control data, the first set of access control data specifying that the user has a right to perform an action with respect to the first section;
    wherein the second set of section data identifies a second set of access control data, the second set of access control data specifying that the user does not have a right to perform the action with respect to the second section; and
    wherein the method further comprises:
        receiving, at the computing device, a request from the user to perform the action with respect to the first section;
        in response to receiving the request from the user to perform the action with respect to the first section:
            determining, by the computing device, that the first set of access control data specifies that the user has the right to perform the action with respect to the first section; and
            after determining that the user has the right to perform the action with respect to the first section, performing, by the computing device, the action with respect to the first section;
        receiving, at the computing device, a request from the user to perform the action with respect to the second section; and
        in response to receiving the request from the user to perform the action with respect to the second section:
            determining, by the computing device, that the second set of access control data specifies that the user does not have the right to perform the action with respect to the second section; and
            after determining that the user does not have the right to perform the action with respect to the second section, denying, by the computing device, the request to perform the action with respect to the second section.

2. The method of claim 1, wherein the presentation file contains a third set of section data, the third set of section data defining a third section of the electronic slide presentation, the third section of the electronic slide presentation not including any slides.

3. The method of claim 1,
    wherein the method further comprises:
        receiving, at the computing device, section selection input that indicates that the user wants the output device to display a sequentially first slide in the second section by selecting the title of the second section included in the graphical interface;
        in response to receiving the section selection input, updating, by the computing device, the graphical interface such that the graphical interface includes an image of the sequentially first slide in the second section; and
        displaying the updated graphical interface on the output device.

4. The method of claim 1, wherein the method further comprises:
    receiving, at the computing device, section concealment input that indicates that the user wants to conceal the thumbnail images of the slides in the first section;
    in response to receiving the section concealment input, updating, by the computing device, the graphical interface such that the graphical interface does not include any thumbnail images of the slides in the first section; and
    displaying the updated graphical interface on the output device.

5. The method of claim 1, wherein the method further comprises:
    receiving, at the computing device, section selection input that indicates that the user has selected the first section by selecting the title of the first section on the graphical interface;
    in response to receiving the section selection input, updating, by the computing device, the graphical interface such that the thumbnail images of the slides in the first section are visually differentiated from the thumbnail images of the slides in the second section; and
    displaying the updated graphical interface on the output device.

6. The method of claim 5, further comprising:
    after displaying the updated graphical interface, receiving, at the computing device, copy command input;
    after receiving the copy command input, receiving, at the computing device, paste command input; and
    in response to receiving the paste command input, copying the first set of presentation data to a location indicated by the paste command input.

7. The method of claim 6, wherein the location indicated by the paste command input is in a second electronic presentation.

8. The method of claim 1, wherein the action is selected from a group of actions that consists of: viewing slides and editing slides.

9. The method of claim 1,
wherein the user is a first user;
wherein the computing device is a first computing device;
wherein the method further comprises enabling, by the first computing device, the first user to edit slides in the first section at the same time that a user of the second computing device is editing slides in the second section.

10. The method of claim 1,
receiving, at the computing device, section selection input that indicates the first section as a selected section; and
printing, by a printing device, the slides associated with the selected section.

11. The method of claim 1,
wherein the presentation file is a first presentation file; and
wherein the first set of section data identifies the slides in the first section and the title of the first section by specifying a link to a third set of section data contained in a second presentation file, the third set of section data containing data that directly represents the slides in the first section and containing data that directly represents the title of the first section.

12. The method of claim 1,
wherein the first set of section data includes a property of the first section, a value of the property specifying whether the slides in the first section are to be displayed during a presentation of the electronic slide presentation, the value of the property defined by the user; and
wherein the method further comprises:
receiving, at the computing device, input that indicates that the user wants to present the electronic presentation;
after receiving the input, using the value of the property to determine whether to display the slides of the first section;
generating, by the computing device, a presentation graphical interface that includes a slide in the first section after determining that the value of the property indicates that the slides in the first section are to be displayed in the presentation of the electronic presentation; and
displaying the presentation graphical interface on the output device.

13. The method of claim 1, wherein the first section is a child section of the second section.

14. The method of claim 1,
wherein the computing device comprises:
a processing unit implemented as a set of integrated circuits that includes at least one integrated circuit;
an output device interface that facilities communication with the output device; and
an input device interface that receives input from an input device used by the user.

15. A computing device comprising:
an output device; and
a storage medium comprising:
a presentation file stored on a computer-readable storage medium, the presentation file containing:
a first set of section data, the first set of section data defining a first section of the electronic slide presentation, the first set of section data identifying slides in the first section of the electronic slide presentation and identifying a user-defined title of the first section, and
a second set of section data, the second set of section data defining a second section of the electronic slide presentation, the second set of section data identifying slides in the second section of the electronic slide presentation and identifying a user-defined title of the second section; and
computer-executable instructions; and
a processing unit that reads the computer-executable instructions from the storage medium and executes the computer-executable instructions, execution of the computer-executable instructions by the processing unit causing the processing unit to:
access the presentation file;
generate a graphical interface, the graphical interface including the title of the first section, thumbnail images of the slides in the first section, the title of the second section, and thumbnail images of slides in the second section; and
display the graphical interface on the output device;
wherein the first set of section data identifies a first set of access control data, the first set of access control data specifying that the user has a right to perform an action with respect to the first section;
wherein the second set of section data identifies a second set of access control data, the second set of access control data specifying that the user does not have a right to perform the action with respect to the second section; and
wherein execution of the computer-executable instructions by the processing unit further causes the processing unit to:
in response to receiving a request from the user to perform the action with respect to the first section:
determine that the first set of access control data specifies that the user has the right to perform the action with respect to the first section; and
after determining that the user has the right to perform the action with respect to the first section, perform the action with respect to the first section; and
in response to receiving a request from the user to perform the action with respect to the second section:
determine that the second set of access control data specifies that the user does not have the right to perform the action with respect to the second section; and
after determining that the user does not have the right to perform the action with respect to the second section, deny the request to perform the action with respect to the second section.

16. A computer-readable storage medium comprising:
a presentation file stored on a computer-readable storage medium, the presentation file containing:
a first set of section data, the first set of section data defining a first section of an electronic slide presentation, the first set of section data identifying slides in the first section of the electronic slide presentation, the first set of section data identifying a user-defined title of the first section, and the first set of section data identifying a first set of access control data, the first set of access control data specifying that a first user has a right to perform an action with respect to the first section, the first set of access control data defined by a second user, and
a second set of section data, the second set of section data defining a second section of the electronic slide presentation, the second set of section data identifying slides in the second section of the electronic slide presentation, the second set of section data identifying a user-defined title of the second section, and the second set of section data identifying a second set of access control data, the second set of access control data specifying that the first user does not have a right to perform the action with respect to the second section, the second set of access control data defined by the second user; and instructions that, when executed by a processing unit of a computing device, cause the processing unit to:

access the presentation file;

generate a graphical interface that displays the title of the first section, the slides in the first section, the title of the second section, and the slides in the second section;

receive a request from the first user to perform the action with respect to the first section;

in response to receiving the request from the first user to perform the action with respect to the first section:

determine that the first set of access control data specifies that the first user has the right to perform the action with respect to the first section; and perform the action with respect to the first section after determining that the first user has the right to perform the action with respect to the first section;

receive a request from the first user to perform the action with respect to the second section; and in response to receiving the request from the first user to perform the action with respect to the second section:

determine that the second set of access control data specifies that the first user does not have the right to perform the action with respect to the second section; and deny the request to perform the action with respect to the second section after determining that the first user does not have the right to perform the action with respect to the second section.

17. The computer-readable storage medium of claim 16, wherein the action with respect to the first section comprises editing one of the slides in the first section; and wherein the action with respect to the second section comprises editing one of the slides in the second section.

\* \* \* \* \*

UNITED STATES PATENT AND TRADEMARK OFFICE
CERTIFICATE OF CORRECTION

PATENT NO. : 8,108,777 B2  Page 1 of 1
APPLICATION NO. : 12/189583
DATED : January 31, 2012
INVENTOR(S) : Nathan Penner et al.

It is certified that error appears in the above-identified patent and that said Letters Patent is hereby corrected as shown below:

In The Claims:
In column 13, line 41, in Claim 1, delete "device:" and insert -- device; --, therefor.

Signed and Sealed this
Twentieth Day of March, 2012

David J. Kappos
*Director of the United States Patent and Trademark Office*